May 7, 1935. H. B. BISHOP 2,000,211
MAKING MANGANESE SULPHUR COMPOUNDS
Filed Aug. 11, 1933
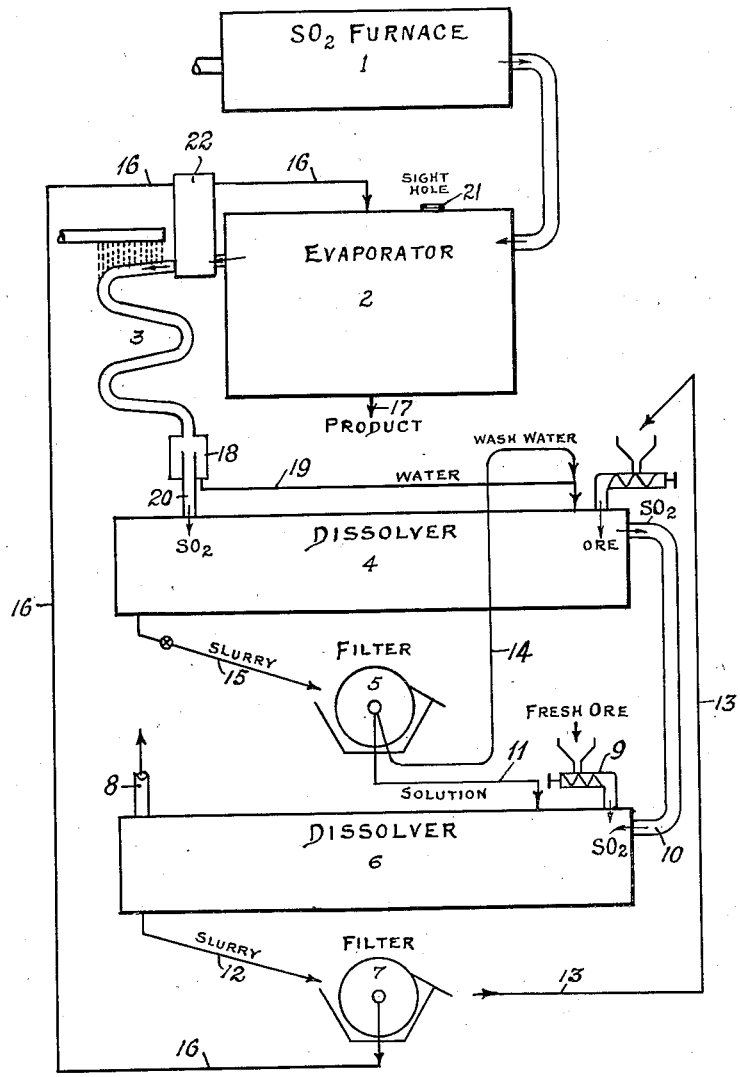
INVENTOR.
HOWARD B. BISHOP
BY
ATTORNEYS.

Patented May 7, 1935

2,000,211

UNITED STATES PATENT OFFICE 2,000,211

MAKING MANGANESE SULPHUR COMPOUND

Howard B. Bishop, Summit, N. J.

Application August 11, 1933, Serial No. 684,623

17 Claims. (Cl. 23—117)

The invention relates to methods of making manganese sulphur compounds such as manganese sulphate by treating a manganese ore with sulphur dioxide. The object of the invention is to provide an economical method of procedure, the cost of which is sufficiently low to permit the wide use of manganese sulphur compounds as fertilizers.

The action of sulphur dioxide on manganese compounds for extracting manganese from its ores has long been made the subject of numerous attempts and suggestions of ingenious minds as a possible means for producing manganese sulphate. So far as I am aware, however, no process thus far suggested has ever been successfully employed for making manganese sulphate at a cost sufficiently low to permit its use on a large scale as a fertilizer.

The value of manganese in permitting the growth of crops when applied to the soil in the form of a soluble salt, such as manganese sulplate, s recognized, but its benefits cannot be realized until it is producible on a large scale and at low cost. The primary object of the present invention is to accomplish this result successfully.

When sulphur dioxide is applied to a manganese ore (containing $MnO_2$) in the presence of water, the manganese is dissolved in the form of an aqueous solution of its sulphate. In order to obtain the salt in anhydrous form for marketing and shipping, it is necessary to evaporate the water and the cost of evaporation is prohibitive. I have now found that if only a limited amount of water is used in treating the ore and the procedure is otherwise conducted as hereinafter described, the desired anhydrous manganese sulphur compounds can be produced at a minimum of expense and great efficiency. In this connection I found that the greatest solubility of the salt occurs at moderate temperatures of the order of 35° C. and this observation leads me to treat the ore at about this temperature in order to make a solution of the desired high concentration. If the solution is hot the rate of the reaction is greatly retarded because the $SO_2$ does not dissolve in sufficient concentration to attack the ore adequately. For the purposes of the new method, therefore, the extraction step of the process takes place at moderate temperatures of the order of 35° C. Furthermore, I have found it desirable, in order to secure complete removal of the $SO_2$ from the furnace gases in the treatment of a slurry of manganese ore with $SO_2$ to conduct this procedure in separate stages involving in the second stage contact of fresh ore with gas that has passed through the first stage and in the first stage subjecting the used ore from the second stage to contact with fresh gas. At the end of the extraction step the liquid is preferably spray-dried in an environment whose temperature is derived from the inflowing gas stream on its way to the first stage of the extraction procedure. The sulphur dioxide for the reaction is preferably made by burning sulphur so that the $SO_2$ gases, led directly into the system of my new process, possess an elevated temperature. This relatively high temperature is not desirable for the extraction step for the reasons heretofore explained, but I have found that the heat can be economically employed, to evaporate the manganese solution in the spray drier and at the same time, in association with the further cooling and condensation of the water released in the evaporation step, to bring the temperature of the $SO_2$ to about 35° C. at which temperature it is most efficient for extraction purposes.

According to the new method, the hot furnace gas, rich in $SO_2$, is brought into direct contact with the clear, strong $MnSO_4$ solution after the solution has been separated from the ore and the heat of the $SO_2$ is used to assist in obtaining the anhydrous product and simultaneously to bring the gas to the proper temperature for contact with the ore. The cool gas from this first operation is then brought into intimate contact with the nearly exhausted ore which is in the form of a slurry. The gases are finally scrubbed with a slurry of fresh ore made by mixing the settled solution from the first treatment with fresh ground ore, thereby recovering substantially the whole of the $SO_2$ content of the furnace gas.

By these operations I am able to produce manganese sulphur compounds or manganese sulphate at a cost well within the range that permits its profitable use as a fertilizer. It is, of course, understood that the apparatus must be made of suitable design and be resistant to the corrosive action of moist $SO_2$.

The method is illustrated in the accompanying drawing. In the drawing 9 indicates the point at which fresh ore ground to 100 mesh is fed into the system. Through the passage 9 the ore enters the dissolver 6 and in the dissolver 6 the fresh ore scrubs the gas from the dissolver 4 which enters dissolver 6 through the line 10. This scrubbing of the gas takes place in the presence of solution entering dissolver 6 through line 11 from dissolver 4 after separation of such solution from the tailings in the filter 5. The spent gas escapes to the atmosphere as indicated at 8 after passing through the dissolver 6 co-current with the slurry therein. The slurry leaves dissolver 6 through line 12 and goes to filter 7. The ore separated in filter 7 passes through line 13 to the dissolver 4, wherein it is treated with fresh cooled gas in the presence of water condensed in the cooler 3 and the wash water from the filter 5 entering through line 14. The slurry from dissolver 4 passes through the slurry line 15 to the filter 5 whence the filtered solution passes through line 11 into dissolver 6, while the exhausted tails are discarded. The clear, strong solution from the filter 7 goes to the evaporator 2 through line 16 and in the evaporator 2 the solution is evaporated by the heat of the gases from the $SO_2$ furnace 1 and the solid anhydrous product is withdrawn at 17 through the gas-tight outlet of known design. A sight hole 21 enables the operator to inspect the conditions in the evaporator 2 and to control in accordance with such observations, the proper functioning of the procedure. The gas from the evaporator 2 consists of the gas from the $SO_2$ furnace and water vapor derived from the evaporation of the sulphate solution. These mixed gases and vapors pass through the cooler 3, the water condensing. From the separator 18 the condensed water flows through line 19 into one end of the dissolver 4, while the uncondensed gas enters the dissolver 4 through the line 20, thence passing counter-current to the movement of the slurry through the dissolver 4, out through the line 10, into dissolver 6 and finally, as gas stripped of its $SO_2$, into the air at 8. By passing the gas through dissolver 4 counter-current to the movement of the slurry, the strongest gas will be effective upon the most nearly spent portion of the ore so that the ore values available for the process may be most completely extracted. In dissolver 6, on the other hand, where it is desired to extract from the gas substantially its entire $SO_2$ content, irrespective of the extent to which the values of the ores may be extracted, since the residual ores are subsequently fed to the dissolver 4 in any event for complete extraction, the $SO_2$ gas is flowed co-current with the ore, being introduced at the point where the ore, being fresh ore, is richest in content of material with which $SO_2$ readily combines. This results before the gas reaches the outlet 8 in substantial stripping of all $SO_2$ from the gas. The arrangement by which the gas flows counter-current with the slurry in one stage and co-current in the other stage is therefore one, by means of which the ore is completely stripped of its values in the counter-current stage, while the gas is stripped of its $SO_2$ in the co-current stage, whereby the full capacity of the two reactants is realized.

Sulphur and air may be passed to the furnace 1 under forced draft or the system be placed under suction at 8, or both of these types of circulation inducers may be used.

Properly operated and under normal conditions the heat of the gases from the $SO_2$ furnace 1 is sufficient for the completion of the evaporation of the product, but the use of supplemental heat in the evaporator 2 is not excluded. The evaporator 2 may be, for example, a tank 20 feet in diameter and about eight feet high, the spray drier being associated with the solution entering through the line 16. The dissolvers 4 and 6 are preferably provided, as is common with such apparatus, with rotating stirrers and partitions between stirrer arms so as to assure good conduct between the gas and the slurry passing through the dissolver.

It will be noted that the same water passes through the system over and over again since the water of the solution which leaves filter 7 is constantly evaporated off and recondensed at 3 and thereupon supplies the water required for the slurry. The supply of water is supplemented by the wash water used in filter 5. The amount of water circulating in the system is, of course, regulated with relation to the amount of ore which the system is to treat.

It will be observed that the procedure throughout is practically self-contained and requires no undue operating expense or expensive auxiliary heat. The $SO_2$ gas is used as hot gas at the point where heat is desired for evaporation and is used as cooled gas at the point where contact with the ore is established and where the cooler temperature is more advantageous. Each section and part of the new process is fitted with relation to each other part and there is a harmonious co-operation toward a single unitary result with respect to all the different conditions prevailing in the different portions of the system. The spray drier referred to may be of any suitable variety but the preferred construction is along the lines of the well-known type of spray drier which includes a high speed rotating bowl into which the solution to be sprayed is fed at the center.

Inasmuch as dissolver 6 is operated at a comparatively low temperature and the solution passing through line 16 is also at this temperature, it is possible to arrange the line 16 and the condenser 3 in such a manner that the hotter gas from the evaporator 2 and the cooler solution in the line 16 are made to pass counter-current through a heat transfer indicated at 22 so that the manganese solution to be evaporated will be preheated by the hotter gas from the evaporator 2 before entering the evaporator while the cooler solution in 16 simultaneously assists in the cooling and in the condesation of water vapor in the gas.

A further advantage of the closed system described is that any manganese sulphate dust carried by the gases leaving the evaporator 2 will be caught, dissolved in the water and carried back to the process instead of escaping into the atmosphere or requiring a special dust catcher.

A typical burner gas would contain about 7½% $SO_2$. Experiments show that when such a gas is passed through two grams of ore in 250 c. c. water for fifteen minutes at 95° C. the result is only two-thirds as efficient as when the temperature is kept at 35° C. The course of the $SO_2$ through the process therefore involves its initial use as a high temperatured gas for evaporation, its subsequent use as a moderately cool (35° C.) gas in the dissolvers, and finally, combined with the manganese as a means for cooling the gases entering the dissolver and for preheating the solution thus assisting in the evaporation of water vapor from the salt.

The product is generally referred to as manganese sulphate, though it would perhaps be more accurate to call it a manganese sulphur compound by reason of the fact that other sulphur compounds, such as the thio sulphate and others are and may be present without injury and without altering the process as such. In using the expression "manganese sulphate" in the claims, I therefore intend to include the sulphur compounds generally.

I claim:
1. The improvement in the art of making man- ganese sulphur compounds which consists in passing relatively cool SO₂ into a slurry of manganese ore containing MnO₂, separating the resultant manganese sulphate solution as a relatively cool liquid and causing said cool solution to impart, in part at least, to the SO₂ used in the first step its relatively low temperature.

2. The method of making manganese sulphate which comprises in continuous sequence (1) evaporating a manganese sulphate solution by heat derived in part from hot gases of a sulphur burner (2) treating manganese ore containing MnO₂, in the presence of water, with the cooled gas after it has passed through the evaporation step and (3) subjecting the resultant manganese sulfate solution to evaporation in step (1).

3. In the process set forth in claim 2 passing the solution in heat exchange relation with SO₂ containing gas used in the evaporation step, prior to the introduction of the gas into the slurry and prior to the introduction of the solution to the evaporating stage.

4. The improvement in the art of making manganese sulphur compounds which consists in producing hot SO₂ containing gas, cooling said gas and during the course of such cooling using its heat to evaporate a manganese sulphate solution and producing the manganese sulphate solution by leading the cooled gas into contact with a slurry of manganese ore containing MnO₂.

5. The improvement in the art of making manganese sulphur compounds which consists in leading SO₂ containing gas at an elevated temperature into evaporating contact with divided liquid particles of relatively cool manganese sulphate solution, evaporating off the water vapor of the liquid particles and cooling the gas, leading the gas away from the liquid, introducing it at a relatively cool temperature unto a slurry of water and manganese ore containing MnO₂, separating the resultant solution and dividing it into liquid particles in the presence of the heat and of the SO₂ containing gas of the first step.

6. The improvement in the art of making manganese sulphur compounds which consists in leading SO₂ containing gas at an elevated temperature into evaporating contact with divided liquid particles of relatively cool manganese sulphate solution, evaporating off the water vapor of the liquid particles and cooling the gas, withdrawing the evaporated product as a relatively dry powder, leading the gas away from the liquid, introducing it at a relatively cool temperature of the order of 35° C. into a slurry of water and manganese ore containing MnO₂, separating the resultant solution and dividing it into liquid particles in the presence of heat and the SO₂ containing gas of the first step.

7. The improvement in the art of making manganese sulphur compounds which consists in leading SO₂ containing gas at an elevated temperature into evaporating contact with divided liquid particles of relatively cool manganese sulphate solution, evaporating off the water vapor of the liquid particles and cooling the gas, leading the gas away from the liquid, cooling the gas to condense its water vapor content, introducing the gas and the condensed water at a relatively cool temperature into a relatively cool slurry of water and manganese ore containing MnO₂, separating the resultant solution and dividing it into liquid particles of heat and the SO₂ containing gas of the first step.

8. The improvement in the art of making manganese sulphur compounds which consists in leading SO₂ containing gas at an elevated temperature into evaporating contact with divided liquid particles of relatively cool manganese sulphate solution, evaporating off the water vapor of the liquid particles and cooling the gas, leading the gas away from the liquid, introducing it at a relatively cool temperature into and counter-current with respect to a slurry of water and manganese ore containing MnO₂, separating the resultant solution and dividing it into liquid particles in the presence of heat and the SO₂ containing gas of the first step.

9. The improvement in the art of making manganese sulphur compounds which consists in leading SO₂ containing gas at an elevated temperature into evaporating contact with divided liquid particles of relatively cool manganese sulphate solution, evaporating off the water vapor of the liquid particles and cooling the gas, leading the gas away from the liquid, introducing it at a relatively cool temperature into and counter-current with respect to a slurry of water and manganese ore containing MnO₂, separating the solution from the tails, introducing the separated solution into contact with a slurry of water and manganese ore containing MnO₂ and simultaneously introducing into said slurry the residual gas containing SO₂ after its passage through the first named slurry, separating the solution of said second slurry from the solid matter, introducing the said solid matter into the first named slurry and dividing the separated solution into liquid particles in the presence of heat and the SO₂ containing gas of the first step.

10. The improvement in the art of making manganese sulphur compounds which consists in leading SO₂ containing gas at an elevated temperature into evaporating contact with divided liquid particles of relatively cool manganese sulphate solution, evaporating off the water vapor of the liquid particles and cooling the gas, leading the gas away from the liquid, introducing it at a relatively cool temperature and counter-current with respect to a slurry of water and manganese ore containing MnO₂, separating the solution from the tails, introducing the separated solution into contact with a slurry of water and manganese ore containing MnO₂ and simultaneously introducing into said slurry the residual gas containing SO₂ after its passage through the first named slurry, passing said gas co-current through said slurry, separating the solution of said second slurry from the solid matter, introducing the said solid matter into the first named slurry and dividing the separated solution into liquid particles in the presence of heat and the SO₂ containing gas of the first step.

11. The process as set forth in claim 9 wherein, in connection with the separation of the slurry into solution and tails, wash water is used and said wash water is reintroduced into the slurry which is being treated with the SO₂ containing gas.

12. The improvement in the art of making manganese sulphur compounds which consists in passing SO₂ containing gas into a slurry of manganese ore containing MnO₂ at a temperature at approximately 35° C., separating the resultant solution from the slurry, spray drying the solution in the presence of heat and SO₂ containing gas, to evaporate off the water vapor, cooling the resultant gas to approximately 35° C., and introducing it at said temperature to the first named slurry.

13. The improvement in the art of making manganese sulphur compounds which consists in establishing a supply of $SO_2$-containing gas of elevated temperature, reducing said elevated temperature to a relatively cool temperature, treating a slurry of manganese ore containing $MnO_2$ with $SO_2$ contained in the relatively cool gas, in separate stages, contacting the fresh gas first with used ore of a later stage and then contacting fresh ore in the later stage with used gas of the first stage, separating the solution of the later stage and evaporating the same to a dry power.

14. In the process set forth in claim 13, maintaining the $SO_2$ containing gas at a relatively cool temperature throughout its traverse of all steps of the process, subsequent to the initial reduction of temperature of said gas.

15. In the process set forth in claim 13, spray-drying the solution in the presence of $SO_2$ containing gas and heat, thereby reducing the temperature of the gas, then further cooling the gas and thereupon introducing it as cooled gas into the slurry of the first stage.

16. In the process set forth in claim 13, cooling $SO_2$ containing gas, separating its water vapor as liquid and introducing the gas as cooled gas into the slurry of the first stage and introducing the condensed water into the ore intake end of the first stage.

17. In the process set forth in claim 13, passing the gas and slurry counter-current in the first stage and co-current in the later stage.

HOWARD B. BISHOP.